United States Patent
Duprey et al.

(10) Patent No.: US 6,887,614 B2
(45) Date of Patent: May 3, 2005

(54) END CAP ASSEMBLY FOR AN ELECTROCHEMICAL CELL

(75) Inventors: Kevin Duprey, West Hartford, CT (US); John A. Hession, Braintree, MA (US); Robert A. Yoppolo, New Milford, CT (US)

(73) Assignee: The Gillette Company, Boston, MA (US)

( * ) Notice: Subject to any disclaimer, the term of this patent is extended or adjusted under 35 U.S.C. 154(b) by 585 days.

(21) Appl. No.: 09/918,072

(22) Filed: Jul. 30, 2001

(65) Prior Publication Data

US 2003/0022061 A1 Jan. 30, 2003

(51) Int. Cl.[7] .................................................. H01M 2/12
(52) U.S. Cl. .............................. 429/56; 429/53; 429/72; 429/82; 429/185
(58) Field of Search ................................ 429/53, 54, 55, 429/56, 72, 82, 163, 185

(56) References Cited

U.S. PATENT DOCUMENTS

| | | | |
|---|---|---|---|
| 3,314,824 A | | 4/1967 | Spanur |
| 3,617,386 A | | 11/1971 | Bosben |
| 4,227,701 A | | 10/1980 | Tsuchida |
| 4,237,203 A | | 12/1980 | Tsuchida |
| 4,803,136 A | * | 2/1989 | Bowsky et al. ............... 429/56 |
| 5,080,985 A | | 1/1992 | Wiacek et al. |
| 5,150,602 A | | 9/1992 | Payne et al. |
| 5,491,038 A | | 2/1996 | DePalma et al. |
| 5,532,081 A | | 7/1996 | DePalma et al. |
| 5,750,283 A | | 5/1998 | DePalma et al. |
| 5,759,713 A | | 6/1998 | DePalma et al. |
| 5,962,158 A | | 10/1999 | Yoppolo et al. |
| 6,127,062 A | * | 10/2000 | Sargeant et al. ............. 429/53 |
| 6,143,439 A | | 11/2000 | Yoppolo et al. |
| 6,147,472 A | | 11/2000 | Hewes et al. |
| 6,232,749 B1 | | 5/2001 | Hewes et al. |
| 6,333,172 B1 | * | 12/2001 | Rine et al. ................. 435/69.1 |
| 6,641,947 B1 | | 11/2003 | Molloy et al. |

OTHER PUBLICATIONS

U.S. Appl. No. 10/648,974, filed Aug. 27, 2003, Drinking Container, John A. Hession.
U.S. Appl. No. 10/457,254, filed Jun. 9, 2003, Straw Receptacle Lid, John A. Hession.
U.S. Appl. No. 08/904,173, filed Jul. 31, 1997, Method and Apparatus for Implementing Software Connectivity for Client/Server Applications, John A. Hession.

(Continued)

Primary Examiner—Frankie L. Stinson
Assistant Examiner—Monique Wills
(74) Attorney, Agent, or Firm—Barry D. Josephs; Paul I. Douglas; Thomas G. Krivulka

(57) ABSTRACT

An end cap seal assembly for an electrochemical cell such as an alkaline cell is disclosed. The end cap assembly comprises a convoluted metal support disk and underlying insulating sealing disk. The convoluted support disk has a downwardly extending wall with at least one aperture therethrough which preferably faces the ambient environment. The insulating disk has a slanted downwardly extending wall forming a rupturable membrane which underlies and abuts the inside surface of the downwardly extending wall of the support disk. The rupturable membrane is slanted downwardly at an acute angle with the cell's longitudinal axis. The rupturable membrane underlies and abuts the aperture in the downwardly extending wall of the end cap. When gas pressure within the cell exceeds a predetermined level the rupturable membrane pushes through said aperture and ruptures allowing gas to escape therefrom to the environment. A separate terminal plate can be stacked onto the metal support disk and welded thereto.

29 Claims, 4 Drawing Sheets

OTHER PUBLICATIONS

U.S. Appl. No. 10/629,929, filed Jul. 29, 2003, Air Manager System for Metal Air Battery, Robert Yoppolo.
U.S. Appl. No. 10/417,363, filed Apr. 16, 2003, Alkaline Cell with Flat Housing, Robert A. Yoppolo.
U.S. Appl. No. 10/414,750, filed Apr. 16, 2003, Alkaline Cell with Flat Housing, Robert A. Yoppolo.
U.S. Appl. No. 10/414,667, filed Apr. 16, 2003, Alkaline Cell with Flat Housing, Robert A. Yoppolo.
U.S. Appl. No. 10/397,494, filed Mar. 26, 2003, End Cap Seal Assembly for an Electrochemical Cell, Robert A. Yoppolo.
U.S. Appl. No. 10/336,475, filed Jan. 3, 2003, Alkaline Cell with Flat Housing and Improved Current Collector, Robert A. Yoppolo.
U.S. Appl. No. 10/336,261, filed Jan. 3, 2003, Alkaline Cell with Flat Housing, Robert A. Yoppolo.
U.S. Appl. No. 09/918,072, filed Jul. 30, 2001, End Cap Assembly for an Electrochemical Cell, Robert A. Yoppolo.
U.S. Appl. No. 08/295,336, filed Aug. 24, 1994, Seal for Electrochemical Cell, Robert A. Yoppolo.
U.S. Appl. No. 08/295,116, filed Aug. 24, 1994, Upward Deflecting Support Disk for Electrochemical Cell Seal, Robert A. Yoppolo.
U.S. Appl. No. 29/204,552, filed Apr. 30, 2004, Drinking Cup, John A. Hession.
U.S. Appl. No. 10/836,802, filed Apr. 30, 2004, Resealable Divided Plate, John A. Hession.
U.S. Appl. No. 10/836,019, filed Apr. 29, 2004, Insulated Color–Changing Drinking Cup, John A. Hession.
U.S. Appl. No. 10/819,245, filed Apr. 5, 2004, Drinking Containers, John A. Hession.
U.S. Appl. No. 10/648,974, filed Aug. 27, 2003, Drinking Container, John A. Hession.
U.S. Appl. No. 10/457,254, filed Jun. 9, 2003, Straw Receptacle Lid, John A. Hession.
U.S. Appl. No. 09/918,072, filed Jul. 30, 2001, End Cap Assembly for an Electrochemical Cell, John A. Hession.
U.S. Appl. No. 08/904,173, filed Jul. 31, 1997, Method and Apparatus for Implementing Software Connectivity for Client/Server Applications, John A. Hession.
U.S. Appl. No. 10/397,494, filed Mar. 26, 2003, End Cap Seal Assembly for an Electrochemical Cell, Kevin Duprey.
U.S. Appl. No. 09/918,072, filed Jul. 30, 2001, End Cap Assembly for an Electrochemical Cell, Kevin Duprey.
U.S. Appl. No. 10/722,879, filed Nov. 26, 2003, Alkaline Cell with Flat Housing, Robert A. Yoppolo.
U.S. Appl. No. 10/629,929, filed Jul. 29, 2003, Air Manager System for Metal Air Battery, Robert Yoppolo.
U.S. Appl. No. 10/417,363, filed Apr. 16, 2003, Alkaline Cell with Flat Housing, Robert A. Yoppolo.
U.S. Appl. No. 10/414,750, filed Apr. 16, 2003, Alkaline Cell with Flat Housing, Robert A. Yoppolo.
U.S. Appl. No. 10/414,667, filed Apr. 16, 2003, Alkaline Cell with Flat Housing, Robert A. Yoppolo.
U.S. Appl. No. 10/397,494, filed Mar. 26, 2003, End Cap Seal Assembly for an Electrochemical Cell, Robert A. Yoppolo.
U.S. Appl. No. 10/336,475, filed Jan. 3, 2003, Alkaline Cell with Flat Housing and Improved Current Collector, Robert A. Yoppolo.
U.S. Appl. No. 10/336,261, filed Jan. 3, 2003, Alkaline Cell with Flat Housing, Robert A. Yoppolo.
U.S. Appl. No. 09/918,072, filed Jul. 30, 2001, End Cap Assembly for an Electrochemical Cell, Robert A. Yoppolo.

* cited by examiner

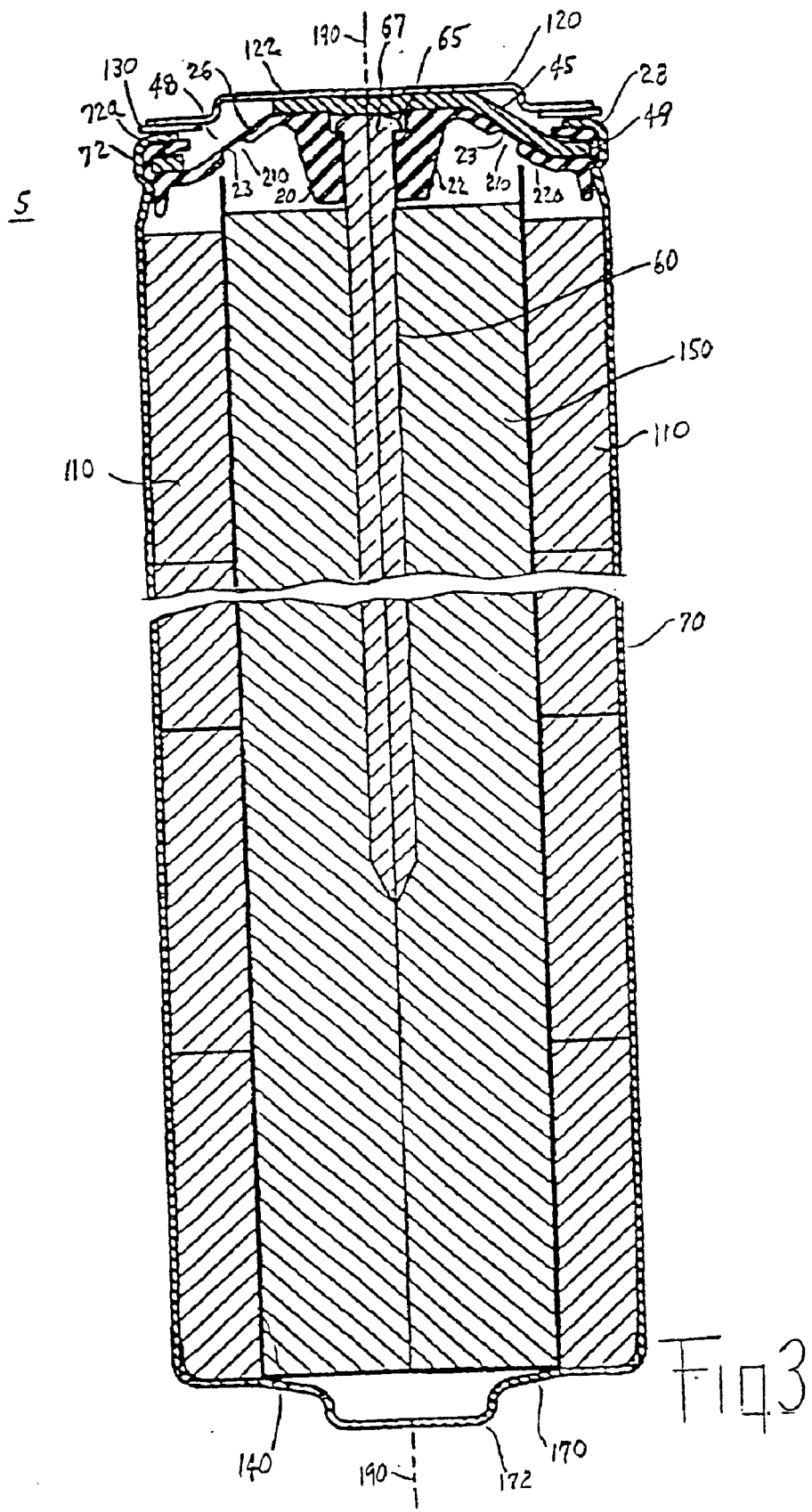

END CAP ASSEMBLY FOR AN ELECTROCHEMICAL CELL

FIELD OF THE INVENTION

The invention relates to an end cap assembly for sealing electrochemical cells, particularly alkaline cells. The invention relates to rupturable devices within the end cap assembly which allows gas to escape from the interior of the cell.

BACKGROUND

Conventional electrochemical cells, such as alkaline cells, are formed of a cylindrical housing having an open end and an end cap assembly inserted therein. After the cell contents are supplied, the cell is closed by crimping the housing edge over the end cap assembly to provide a seal for the cell. The end cap assembly comprises an exposed end cap plate which functions as a cell terminal and typically a plastic insulating member which seals the open end of the cell housing. A problem associated with design of various electrochemical cells, particularly alkaline cells, is the tendency of the cell to produce gases as it continues to discharge beyond a certain point, normally around the point of complete exhaustion of the cell's useful capacity. Electrochemical cells, particularly alkaline cells, are conventionally provided with rupturable diaphragms or membranes within an end cap assembly. The rupturable diaphragm or membrane may be formed within a plastic insulating member as described, for example, in U.S. Pat. No. 3,617,386. Such diaphragms are designed to rupture when gas pressure within the cell exceeds a predetermined level. The end cap assembly may be provided with vent holes for the gas to escape when the diaphragm or membrane is ruptured. The end cap assembly disclosed in U.S. Pat. No. 3,617,386 uses considerable space above the rupturable diaphragm which reduces the amount of available space within the cell for active material. Also, the end cap assembly disclosed in the reference is not designed to withstand radial compressive forces and will tend to leak when the cell is subjected to extremes in hot and cold climate.

In order to provide a tight seal the prior art discloses end cap assemblies which include a metal support disk inserted between the end cap plate and an insulating member, typically a plastic insulating disk which electrically insulates the metal support disk from the cell housing. The metal support disk may have a highly convoluted surface as shown in U.S. Pat. Nos. 5,532,081 or 5,080,985 which assures that end cap assembly can withstand high radial compressive forces during crimping of the cell's housing edge around the end cap assembly. Such support disk allows the radial forces to be maintained. This results in a tight mechanical seal around the end cap assembly at all times.

Also, the prior art discloses rupturable vent membranes which are integrally formed as part of an insulating disk included within the end cap assembly. Such vent membranes are typically in the form of a rupturable disk which lies in a plane perpendicular to the cell's longitudinal axis, for example, as shown in U.S. Pat. No. 4,537,841 or PCT patent application publication WO 00/46864. The rupturable thin portion within the insulating member may also take the form of a circumferential vent membrane as disclosed in U.S. Pat. No. 5,080,985. As shown in these three references the rupturable membrane lies in a plane perpendicular to the cell's longitudinal axis. Also, as shown in these references, there is required considerable free space above the rupturable disk to allow the disk to rupture cleanly and allow gas to escape therethrough. The disadvantage of such designs is that the significant free space above the rupturable membrane represents a void volume which cannot be used for anode and cathode active material. Thus, the potential cell capacity is reduced by the amount of such free space.

U.S. Pat. No. 6,127,062 discloses an insulating sealing disk and an integrally formed rupturable membrane which is oriented vertically, that is, parallel to the cell's central longitudinal axis. The rupturable membrane is straight walled, that is, is not notched, and is disposed against an opening in an overlying metal support member. When the gas pressure within the cell rises to a predetermined level the membrane penetrates into the opening and ruptures thereby releasing the gas pressure. The size of the overlying opening to achieve good outflow of gas when the membrane ruptures is limited by the vertical orientation of the membrane.

Accordingly, it is desirable to have an end cap assembly which provides a tight seal for the cell even though the cell may be exposed to extremes in both hot and cold climate.

It is desirable that the rupturable venting mechanism occupy minimal amount of space within the cell so that the cell can be filled with additional amounts of anode and cathode material, thereby increasing the cell's capacity.

It is desired that and rupturable venting mechanism be readily manufactured so that venting occurs at a specific predetermined pressure level.

SUMMARY OF THE INVENTION

The invention is directed to an electrochemical cell, for example an alkaline cell, comprising an end cap seal assembly inserted into the open end of a cylindrical housing (casing) for the cell. In one aspect the end cap assembly comprises a metal support disk and an underlying insulating sealing disk (insulating grommet) underlying the metal disk when the cell is viewed in vertical position with the metal support disk on top. The end cap assembly also comprises a terminal end cap positioned over the metal support disk. Preferably, the terminal end cap can be stacked over the metal support disk with an insulating washer therebetween. The end cap can be welded to the metal support disk.

The metal support disk is preferably formed of a disk of single piece metallic construction having a convoluted surface and at least one aperture through its surface. The insulating sealing disk has a convoluted surface wherein a portion of its surface underlies the aperture in the metal support disk when the cell is viewed in vertical position with the end cap assembly on top. The portion of said insulating sealing disk underlying said aperture has a groove on the inside surface thereof facing the cell interior The groove having an open end and opposing closed base wherein the base of the groove forms a thinned rupturable membrane. The rupturable membrane abuts the aperture in the metal support disk. When gas pressure within the cell rises said rupturable membrane penetrates through said aperture and ruptures thereby releasing gas directly into the surrounding environment through said aperture.

The insulating sealing disk comprises a plastic material having a downwardly extending wall slanted at an angle less than 90 degrees from the cell's central longitudinal axis and not parallel with said longitudinal axis. The downwardly extending wall of said insulating disk extends downwardly from a high point on the surface of the insulating disk and towards a lower point on its surface which is closer to the cell interior when the cell is viewed in vertical position with the end cap assembly on top. The metal support disk also has a downwardly extending wall slanted at an angle less than 90 degrees from the cell's central longitudinal axis. The downwardly extending wall of the metal support disk extends downwardly from a high point on the surface thereof when the cell is viewed in vertical position with the end cap assembly on top. There is at least one aperture in said downwardly extending wall of the metal support member against which the rupturable membrane abuts. Preferably the downwardly extending wall of the insulating sealing disk can be slanted at an angle of between about 40 and 80 degrees from the cell's central longitudinal axis. The downwardly extending wall of the overlying metal support disk is desirably slanted at the same angle, preferably an angle between about 40 and 80 degrees from the cell's central longitudinal axis, as the downwardly extending wall of the insulating sealing disk. This allows the rupturable membrane portion of the downwardly extending wall of the insulating sealing disk to abut and lie flush against the aperture in the downwardly extending wall of the metal support member.

The groove on the inside surface of the downwardly extending wall insulating sealing disk forming the rupturable membrane portion is preferably made so that it circumvents the center of the insulating disk. At least the portion of such circumventing rupturable membrane abutting said aperture in the metal support disk ruptures when the cell pressure rises to a predetermined level. The rupturable membrane is preferably of nylon or polypropylene. The end cap assembly of the invention allows the burst aperture to be made large and rupturable membrane thickness to be made small thereby reducing the threshold burst pressure. This in turn allows for a reduction in the cell housing wall thickness, thereby increasing the amount of cell internal volume available for active anode an cathode material.

The metal support disk preferably has a substantially flat central portion with a small sized depression centrally located therein. Preferably, a pair of diametrically opposed same size apertures 48 are located in the downwardly extending wall of the metal support disk. After the cell active components are inserted the end cap assembly is inserted into the cell's housing open end. The peripheral edge of the housing is crimped over the peripheral edge of the insulating sealing disk causing the edge of the metal support disk to bite into the sealing disk. The downwardly sloped wall of the metal support disk allows the metal support disk edge to become radially compressed thereby helping to achieve a tight seal.

The protruding end cap assembly 10 of the present invention allows reduction in the steel housing 70 wall thickness, to a level, for example, between about 4 and 8 mils (0.10 and 0.20 mm) and the end cap assembly 10 itself occupies less of the cell's internal volume than conventional cells. These factors in turn allows more anode and cathode active material to be inserted into the cell, thereby increasing the cell's capacity.

BRIEF DESCRIPTION OF THE DRAWINGS

The invention will be better understood with reference to the drawings in which:

FIG. 3 is a cross section of an alkaline cell containing an end cap assembly of the invention.

DETAILED DESCRIPTION

Figure 1:
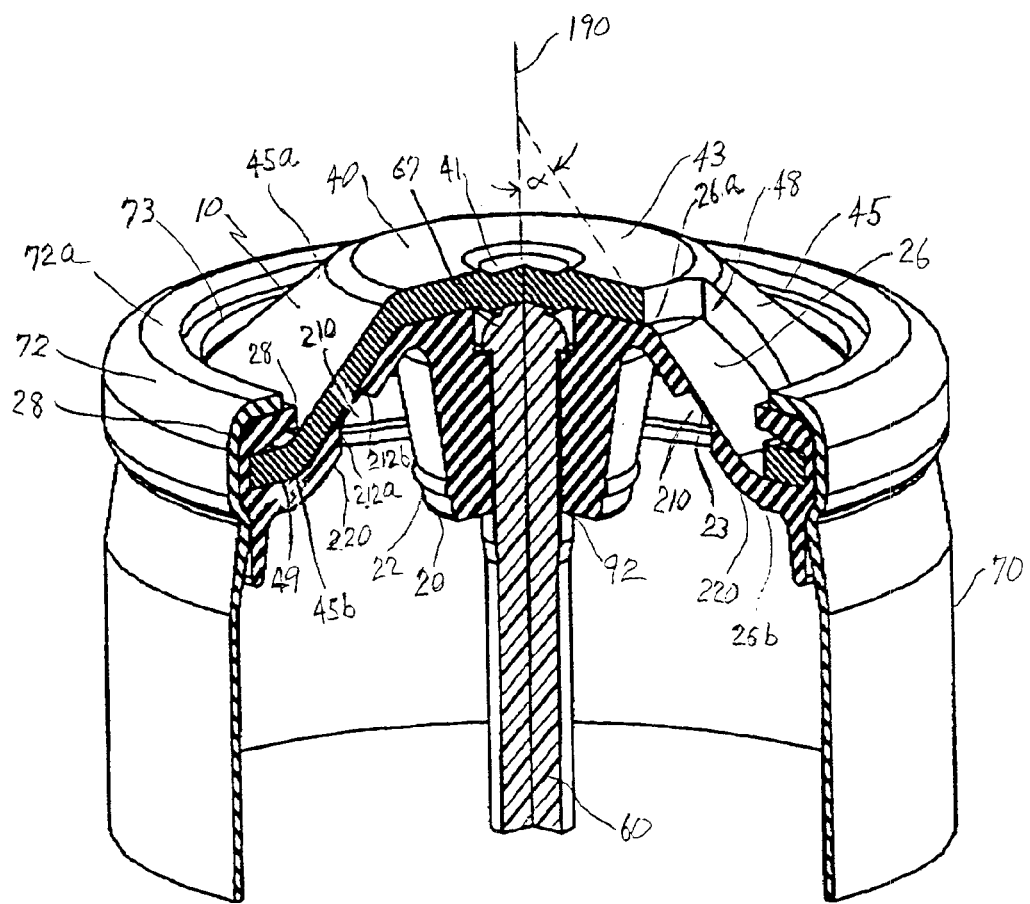
FIG. 1 is a cut-away view in perspective of the end cap assembly of the invention.

A preferred structure of the end cap assembly 10 of the invention is illustrated in FIG. 1. The end cap assembly 10 of the invention has particular applicability to electrochemical cells comprising a cylindrical housing 70 having an open end 73 and opposing closed end 170, wherein the end cap assembly 10 is inserted into said open end 73, to seal the cell. The end cap assembly 10 is particularly applicable to cylindrical alkaline cells of standard AAA (44×9 mm), AA (49×12 mm), C (49×25 mm) and D (58×32 mm) size. Such alkaline cells, as cell 5 (FIG. 3), desirably has an anode 150 comprising zinc, a cathode 110 comprising $MnO_2$, with electrolyte permeable separator 140 therebetween. The anode 150 and cathode 110 typically comprises an electrolyte of aqueous potassium hydroxide.

The end cap assembly 10 of the invention comprises a metal support disk 40, an underlying sealing disk 20, and current collector 60 penetrating through the center of sealing disk 20 and in contact with anode 150. A separate terminal end cap can be stacked over the metal support disk 40 as shown in FIG. 3. The metal support disk 40 preferably has a substantially flat central portion 43 with a small sized depression 41 centrally located therein. The metal support disk is preferably formed of a disk of single piece metallic construction having a convoluted surface and at least one burst aperture 48 through its surface. Preferably, a pair of diametrically opposed same size apertures 48 are located in the downwardly extending wall 45 of the metal support disk 40. The downwardly extending wall 45 of the metal support disk 40 extends downwardly toward the cell interior from a high point 45a on the wall 45 of said support disk 40 to a low point 45b on said wall 45 when the cell is viewed in vertical position with the end cap assembly 10 on top. The downwardly extending wall 45 of support disk 40 is preferably straight in the direction of downward slope (i.e. not bulging in or out) or can have a slightly convex surface contour when viewed from outside the cell. Downwardly extending surface 45 terminates in peripheral edge 49.

The insulating sealing disk 20 has a convoluted surface including downwardly extending wall 26 wherein a portion of its surface underlies and abuts the aperture 48 in the metal support disk 40 when the cell is viewed in vertical position with the end cap assembly on top. The wall 26 of the sealing disk 20 extends downwardly from a high point 26a on the surface thereof to a low point 26b on the surface thereof when the cell is viewed in vertical position with the end cap assembly 10 on top. Surface 26 of insulating disk 20 is preferably straight in the direction of downward slope (i.e. not bulging in or out) but may also have a slightly convex surface contour when viewed from outside the cell. Downwardly extending surface 26 terminates in peripheral edge 28.

The portion of the downwardly extending surface 26 underlying said aperture 48 in the metal support disk 40 has an undercut groove 210 on the inside surface thereof facing the cell interior. The groove 210 has an open end and opposing closed base. The groove base forms a thinned rupturable membrane 23. The rupturable membrane 23 abuts the aperture 48 in the metal support disk 40. When gas pressure within the cell rises said rupturable membrane 23 penetrates through said aperture 48 and ruptures thereby releasing gas into the surrounding environment. Preferably, downwardly extending wall 26 of insulating disk 20 lies flush against the inside surface of downwardly extending wall 45 of metal support disk 40 during assembly. However, after crimping the housing edge 72 over the edge 29 of the sealing disk 20, there can be a very small space between some portions of walls 26 and 45.

Figure 2:
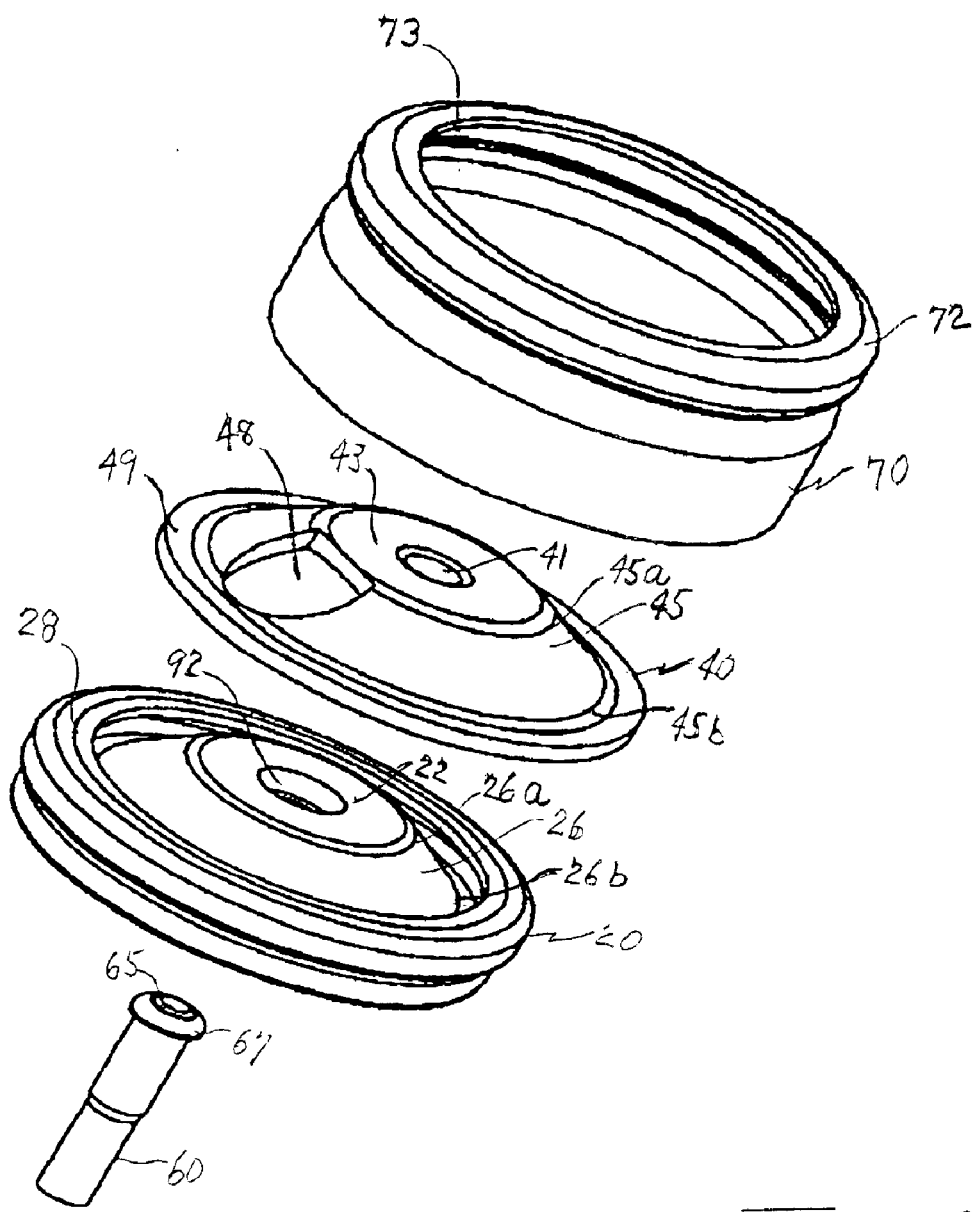
FIG. 2 is an exploded view showing a preferred embodiment of the components of the end cap assembly.
Figure 2A:
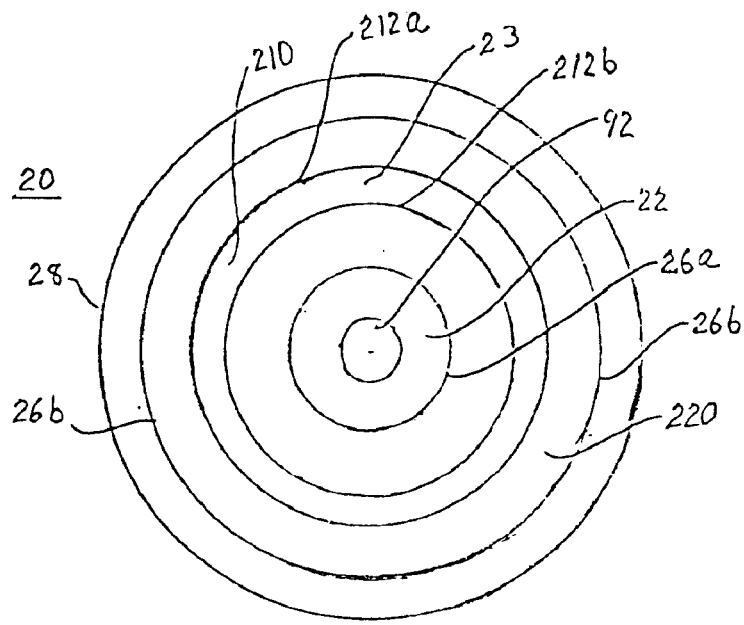
FIG. 2A is a plan view of the sealing disk of FIG. 1 as viewed from the underside of the disk showing the rupturable membrane.

Groove 210 preferably runs circumferentially along the interior side 220 of the downwardly extending wall 26 as shown best in FIG. 2A. The groove 210 forms a thinned portion 23 running preferably circumferentially along the interior side (underside) of downwardly extending wall 26 (FIG. 1 and FIG. 2A). Circumventing groove 210 (FIG. 1 and FIG. 2A) forms a thinned portion, namely, circumventing membrane 23 at the base of groove 210. The thinned portion 23 forms a rupturable membrane which faces and preferably abuts downwardly extending wall 45 of the metal support disk 40 as shown in FIG. 1. There can be one or more apertures 48 in downwardly extending wall 45 of metal support disk 40 (FIG. 1). Preferably there are two apertures in the surface of downwardly extending wall 45. If two apertures 48 are employed they are desirably of about the same size and are located diametrically opposite each on downwardly extending wall 45. The portion of the circumventing thinned membrane 23 running directly under aperture 48 forms a rupturable portion. When gas within the cell builds up to a predetermined level, the portion of membrane 23 immediately under aperture 48 will stretch into the aperture until it ruptures under tension thereby releasing the gas pressure through the aperture.

The opposing groove walls 212a and 212b defining the depth of undercut groove 210 do not have to be of any particular shape of curvature. However, from the standpoint of ease of manufacture the groove walls 212a and 212b can be vertically oriented or may be slanted so that the mouth of groove 210 is wider than the bottom (rupturable membrane portion 23) of the groove. The angle of 212a does not play a factor in the rupturability of membrane 23, since the membrane is preferably intended to rupture in tension, not in shear. Walls 212a and 212b can be conveniently at right angle to rupturable membrane 23 at the base of groove 210 or can form an obtuse angle with the rupturable membrane 23. Alternatively, groove walls 212a and 212b can be formed of flat or curved surface. Desirably, walls 212a and 212b each form flat surfaces forming an obtuse angle, desirably between about 120 and 135 degrees, typically about 126 degrees with rupturable membrane 23 so the open end of the groove 210 is slightly wider than the groove base forming membrane 23. Such preferred embodiment gives circumventing groove 210 a trapezoidal shape as shown in FIG. 1. Such configuration is desirably from the standpoint of ease of manufacture by injection molding and does not effect the rupturability of membrane 23.

The downwardly extending wall 26 and rupturable membrane portion 23 therein is desirably slanted at an acute angle (angle less than 90°) from the cell's central longitudinal angle 190 as illustrated in FIGS. 1 and 3. In such configuration downwardly extending wall 26 and membrane portion 23 therein is not parallel to the cell's central longitudinal axis. Preferably downwardly extending wall 26 is slanted at an acute angle, α, between about 40 and 80 degrees from longitudinal central axis 190 (FIG. 1). Likewise, downwardly extending wall 45 of support disk 40 is preferably slanted at the same acute angle as the downwardly extending wall 26 of seal disk 20, namely between about 40 and 80 degrees from central axis 190. Thus, when the support disk 40 is placed over seal disk 20, the downwardly extending wall 45 of support disk 40 will abut and lie flush against the downwardly extending wall 26 of seal disk 20 and rupturable membrane 23 will abut aperture 48. The slanted orientation of downwardly extending wall 45 of the metal support disk 40 allows larger diameter apertures 48 to be made in the downwardly extending wall 45 for a given overall height of support disk 40. This in turn allows the membrane 23 of a given small thickness to rupture at lower threshold pressure thereby allowing the cell housing 79 wall thickness to be reduced. Reduction in housing 70 wall thickness increases the cell internal volume available for anode and cathode active material thereby increasing cell capacity. Insulating disk 20 may be formed of a single piece construction of plastic insulating material; preferably it is molded by injection molding nylon which is durable and corrosion resistant. As illustrated best in FIGS. 1 and 2, insulating disk 20 has a central boss 22 with aperture 92 through the center thereof. Boss 22 forms the thickest and heaviest portion of disk 20. The peripheral edge of boss 22 terminates in downwardly extending wall 26 which extends downwardly from a high point 26a on said wall 26 to a low point 26b thereon when the cell is viewed in vertical position with the end cap assembly on top. Similarly, the peripheral edge of the center portion 43 of support disk 40 terminates in downwardly extending wall 45 from a high point 45a on said wall 45 to a low point 45b thereon.

Thus, the design of the end cap assembly 10 of the invention having a slanted downwardly extending wall 45 of metal support disk 40 with aperture 48 therethrough represents an improvement over the vertically oriented support wall shown in U.S. Pat. No. 6,127,062 because it provides a greater surface area in turn allowing for larger diameter apertures 48 for a given total height of the support disk 40. The larger diameter aperture 48 together with membrane 23 of small thickness functions to reduce the pressure threshold at which rupture of membrane 23 will occur. This in turn allows the cell housing 70 to have a reduced wall thickness, e.g a wall thickness of between about 4 and 8 mils, thereby providing greater internal volume for active anode and cathode material.

The seal design of the invention also places the rupturable membrane 23 closer to the negative end cap 120. This means that there is more internal space available within the cell for active materials. It has been determined that the total capacity of a AA alkaline cell can be increased by about 3 to 8 percent (compared to prior art seal design as in U.S. Pat. Nos. 5,532,081 and 5,080,985) when the seal assembly of the present invention is employed. Location of the rupturable membrane 23 on downwardly extending wall 26 of the insulating disk 20 also permits gas and other internal components to pass unobstructed from the cell to the environment after membrane rupture even when the cell is connected to another cell or a device being powered.

In the absence of a groove forming a rupurable membrane in the seal, that is, if the entire portion of downwardly sloping wall 26 abutting aperture 48 is of uniform constant thickness and forms the rupturable membrane, the following relationship has been determined to apply approximately between the desired rupture pressure $P_R$, the radius "R" of the burst aperture 48, and thickness "t" of the resulting constant thickness membrane, where "S" is the ultimate tensile strength of the rupturable material.

$$P_r = t/R \times S \quad (I)$$

It is desirable to have the aperture 48 radius large and the thickness of the constant thickness membrane as small as possible. This allows rupture of the membrane at lower threshold pressures, P, of gas buildup in the cells. Thus for a given cell size, there is a practical lower limit to the burst pressure driven by a maximum aperture radius and minimum membrane thickness achievable. The addition of an undercut groove 210 forming a rupturable membrane provides additional variables, such as groove depth and width, with which to manipulate the burst pressure to lower levels.

In the end cap assembly 10 of the invention the ratio of the rupturable membrane width (that is, the width of the base of groove 210) to the thickness of the rupturable membrane 23 is typically between about 2.5 and 12.5. By way of nonlimiting example, the design of the end cap assembly of the invention can accommodate an aperture 48 10 typically as large as between about 3 and 4.5 mm in downwardly slanted wall 45 of metal support disk 40.

Rupture of membrane 23 at lower pressures, of about 500 to 700 psig ($3.38 \times 10^6$ and $4.83 \times 10^6$ pascal) for alkaline AA cells and 300 to 400 psig ($2.03 \times 10^6$ and $2.70 \times 10^6$ pascal) for alkaline C and D cells has been determined to permit use of a housing 70 of nickel plated steel having smaller wall thickness, desirably between about 0.006 and 0.008 inches (0.15 and 0.20 mm), preferably between about 0.006 and 0.007 inches (0.15 and 0.18 mm). The smaller wall thickness for housing 70 is desired, since it results in increased internal volume of the cell permitting use of more anode and cathode material, thereby increasing the cell's capacity. (Conventional wall thicknesses for housing 70 are typically at a level of about 0.10 inches (0.25 mm)). It has been determined that cells with lower housing 70 wall thicknesses of between about 0.006 and 0.008 inches (0.15 and 0.20 mm) function best if membrane 23 is designed to rupture at lower burst pressure, since higher burst pressures exceeding 1000 psig, for example a AA cell with a 4 mil wall thickness, could cause the cell housing 70 to rupture prematurely or could cause the crimped peripheral edge 72 to loosen prematurely as such pressures are approached. The design of the end cap assembly 10 of the invention permits the lower burst pressures to be achieved.

In sum the protruding end cap assembly 10 of the present invention allows reduction in the housing 70 wall thickness and the end cap assembly 10 itself occupies less of the cell's internal volume than conventional cells. These factors in turn allow more anode and cathode active material to be inserted into the cell, thereby increasing the cell's capacity.

In keeping with the desire to employ larger size apertures 48 in the context of the protruding end cap assembly 10 of the invention, it has been determined that this can be achieved best by orienting rupturable membrane 23 and the overlying metal support surface 45 at a slant, that is, not parallel to the longitudinal axis 190. Preferably, membrane 23 and overlying metal support surface 45 are slanted downwardly at an angle, preferably between about 40 and 80 degrees from the central longitudinal axis 190. This provides more available surface area from which to form aperture 48 for a given overall height of support disk 40.

In keeping with the desire to reduce the burst pressure of the cell, it has been determined that this can be achieved by forming an undercut groove 210 on the inside surface of downwardly sloping wall 26 of sealing disk 20. Such undercut groove 210 can be formed, for example, circumventing the center of sealing disk 20, during injection molding at the time of forming the sealing disk 20.

In a preferred embodiment employing a AA size alkaline cell, by way of nonlimiting example, the rupturable membrane 23 can be designed to rupture when gas within the cell builds up to a level of between about 500 and 700 psig ($3.38 \times 10^6$ and $4.83 \times 10^6$ pascal). The rupturable membrane portion 23 underlying apertures 48 is desirably formed of nylon but can also be of other material such as polypropylene. Groove 210 can have a width between about 0.08 and 1 mm, desirably between about 0.08 and 0.8 mm. Groove 210 preferably runs circumferentially around the inside surface 220 of downwardly extending wall 26 of insulating disk 20. A segment of circumferential groove 210 runs immediately under apertures 48 in support disk 40. Alternatively, the groove 210 need not be circumventing but can be formed so that individual grooves are cut immediately under apertures 48 with the portions of the inside surface of wall 26 therebetween left smooth and uncut. The apertures 48 can be of circular shape having a diameter of between about 3 and 8.7 mm, corresponding to an area of between about 7 and 60 mm$^2$, typically between 3 and 4.5 mm, corresponding to an area between about 7 and 16 mm$^2$. It should be recognized that apertures 48 can be of other shape such as oblong or elliptical. Apertures 48 can also be of rectangular or polygonal shape or irregular shapes comprising a combination of straight and curved surfaces. The effective diameter of such oblong or polygonal shape or other irregular shape is also desirably between about 3 and 4.5 mm. The effective diameter with such shapes can be approximately calculated as the minimum distance across any such aperature. This corresponds to an area for aperture 48 desirably between about 7.07 mm$^2$ and 15.90 mm$^2$ (approximately between about 7 and 16 mm$^2$.) However, the aperture can be made even larger so that it has an area between about 7 and 60 mm$^2$.

When the target rupturable pressure is between about 500 and 700 psig ($3.38 \times 10^6$ and $4.83 \times 10^6$ pascal), the ratio of the groove width (width of membrane 23 at base of groove) to the thickness of rupturable membrane 23 is desirably between about 2.5 and 12.5. In keeping with this range of ratio, the groove width at the base of the groove is desirably between about 0.4 and 0.7 mm and the thickness of rupturable membrane 23 is between about 0.08 and 0.15 mm. The apertures 48 have can have a diameter desirably between about 3 and 4.5 mm, corresponding to an area between about 7 and 16 mm$^2$. However, the diameter of aperture 48 in keeping with the present invention can be even larger, for example, in a range between about 3 and 8.7 mm, corresponding to an area between about 7 and 60 mm$^2$.

When C and D alkaline cells are employed rupturable membrane 23 is desirably designed to rupture at lower pressures, e.g., between about 300 and 400 psig ($2.03 \times 10^6$ and $2.70 \times 10^6$ pascal). The same ratio of the groove width (width of membrane 23 at base of groove) to the thickness of rupturable membrane 23 is desirably between about 2.5 and 12.5 is also applicable. Additionally, it is desirable to maintain a ratio of the thickness of the rupturable membrane 23 to the thickness of downwadly extending wall 26 immediately adjacent membrane 23 to be ½ or less, desirably between about ½ and 1/10, more typically between about ½ and ⅕. In such embodiment the rupturable membrane 23 thickness is desirably between about 0.1 and 0.2 mm. The apertures 48 through which the membrane 23 ruptures desirably have a diameter between about 3 and 8 mm.

After the cell active components are inserted into the cell housing 70, the end cap assembly 10 is inserted into the housing open end. The peripheral edge 72 of the housing is crimped over the peripheral edge 28 of the insulating sealing disk 20 causing the edge 49 of the metal support disk to bite into the sealing disk. The downwardly sloped wall 45 of the metal support disk 40 allows the metal support disk edge 49 to become radially compressed thereby helping to achieve a tight seal.

A specific embodiment of the end cap assembly 10 integrated into an alkaline cell 8 is illustrated in FIG. 3. The end cap assembly 10 provides a seal for the open end of cell housing 70 and also has incorporated therein exposed metal support disk 40 of the invention. Metal Support Disk 40 is in the form of a disk preferably of carbon steel having a convoluted surface of about 0.50 mm thickness. Metal support disk 40 can also be of cold rolled steel of about 0.50 mm thickness. Support disk 40 has a flat central portion 43 with a small depressed region 41 at the center. An integrally formed downwardly extending wall 45 extends downwardly from the edge of flat central surface 43. Wall 45 terminates in peripheral edge 49. Wall 45 is preferably a straight surface, that is, not bulging in or out, but can also be a slightly contoured convex surface when viewed with the end cap assembly 10 on top. The total height of the metal support disk 40 is between about 2 and 3 mm for a AA cell housing (housing 70 length about 47 mm) and will protrude out about 1.0 mm from the housing shoulder 72a. The downwardly extending wall 45 of metal support 40 is desirably slanted at an acute angle, $\alpha$, (angle less than 90°) from the cell's central longitudinal angle 190 and thus is preferably not parallel to the cell's central longitudinal axis. Preferably downwardly extending wall 45 is slanted at an acute angle between about 40 and 80 degrees from longitudinal central axis 190. The metal support disk 40 having said slanted downwardly extending wall 45 causes it to function as a radial spring. This allows the end cap assembly 10 to withstand high radial compressive forces when the cell's housing peripheral edge 72 is crimped around the end cap assembly causing the peripheral edge 49 of support disk 40 to bite into peripheral edge 28 producing a tight seal. Peripheral edge 49 is desirably a flat edge oriented perpendicular to the cell's central longitudinal axis 190 (FIG. 1). The seal remains radially compressed even though the cell may be exposed to extremes in cold and hot environmental temperature.

Metal Support Disk 40 may also function as one of the cell's terminal's (negative terminal for alkaline cell). However it is preferable to stack a separate terminal end cap 120 over metal support disk 40 as shown in FIG. 3. In such embodiment an insulating washer 130 of plastic or heavy paper or cardboard can be inserted so that its top surface is welded or adhered to the end cap 120 and its bottom surface rests on housing shoulder 72a (FIG. 3). When membrane 23 ruptures, gas from within the cell can escape through aperture 48 and underneath washer 130 to the environment. The flat central portion 122 of end cap 120 can then be welded to flat central surface 43 of metal support 40. The end cap assembly 10 of the invention occupies less space within the cell than conventional high compressive end cap assemblies for alkaline cells. This allows for inclusion of additional anode and cathode active material to increase cell capacity.

End cap assembly 10 of the invention as best illustrated in FIGS. 1–3 is comprised of a metal support disk 40, an electrically insulating member 20, and elongated current collector 60 and separate terminal end cap 120 stacked over metal support disk 40. Support disk 40, insulating member 20, current collector 60, and open end 73 of housing 70 are shown as individual components, before assembly, in FIG. 2. The insulating member 20 is preferably in the form of an insulating disk (grommet). Insulating disk 20 has an aperture 92 for receiving a metal current collector 60. Preferably the head 67 of the current collector has a flange 65 which acts as a seat for central portion 41 of support disk 40. Thus, when assembling the end cap assembly the current collector 60 can be inserted through aperture 92. The head 67 of current collector 60 can then be welded to the underside of the central portion 41 of the support disk 40. The subassembly comprising metal support disk 40, sealing disk 20 and current collector 60 can then be inserted into the open end 73 of housing. The peripheral edge 72 of cell housing 70 can then be crimped over the peripheral edge 28 of insulating disk 20 so that the edge 49 of metal support disk 40 bites into the insulating peripheral edge 28 thereby radially compressing metal support disk 20. Insulating washer 130 can then be placed over cell shoulder 72a. End cap 120 can be inserted over the washer 130 and the center of end cap 120 welded to metal support disk 40. Alternatively, the current collector head 67 can be first welded to the negative end cap 120. The current collector 60 can then be inserted through the support disk central portion 41 and into aperture 92 of the sealing disk 20. This can be done after the shoulder 72a of casing 70 has been crimped over the peripheral edge 28 of the sealing disk 20 and insulating washer 130 is placed over shoulder 72a.

When insulating disk 20 and integrally formed wall 26 is formed preferably of nylon, it has been determined that the thickness of rupturable membrane 23 may advantageously be between about 0.08 mm and 0.15 mm and the diameter of aperture 48 may be between about 3 and 8.7 mm or the cross sectional area of aperture 48 may be between about 7 mm² and 60 mm². The ratio of rupturable membrane width to thickness is desirably between about 2.5 and 12.5 to achieve rupture pressures in a range between about 300 psig and 800 psig ($2.03 \times 10^6$ and $5.51 \times 10^6$ pascal). In a specific embodiment if the cell is an AA cylindrical alkaline cell (49 mm×12 mm), membrane portion 23 of nylon may desirably have a thickness of about 0.08 mm and width of about 0.6 mm, and circular aperture 48 of diameter about 3.4 mm. With such combination membrane portion 23 will rupture when gas pressure within the cell reaches between about 500 and 700 psig ($3.38 \times 10^6$ and $4.83 \times 10^6$ pascal). The housing 70 comprises nickel plated steel having a wall thickness between 4 and 8 mils (0.10 and 0.20 mm), preferably between 4 and 7 mils (0.10 and 0.18 mm).

Figure 2B:
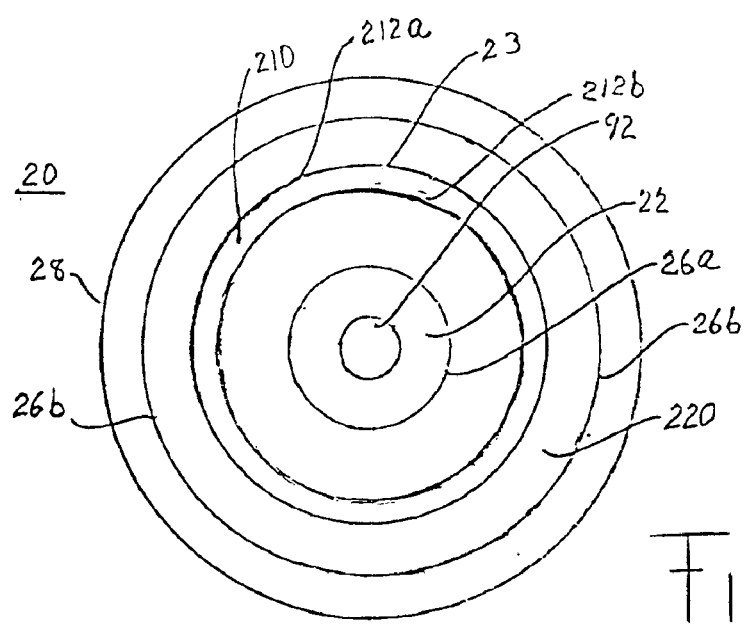
FIG. 2B is a plan view of the sealing disk as viewed from the underside thereof showing an alternate embodiment of the rupturable membrane.

In another embodiment of the sealing disk 20, the disk configuration can be the same as shown in FIG. 1 except that groove 210 can be formed by cutting or stamping a die into the underside 220 of downwardly extending wall 26 of sealing disk 20 after the disk is formed. In such embodiment the sealing disk 20 can be first formed by molding to obtain a downwardly extending wall 26 of uniform thickness, that is, without groove 210. A die having a circumferential cutting edge can then be applied to the underside surface 220 of the sealing disk downwardly extending wall 26. A circumferential or arcuate cut forming groove 210 (FIG. 2B) of width less than 1 mm, desirably between about 0.08 and 1 mm, preferably between 0.08 and 0.8 mm can be made in this manner to the underside surface 220 of downwardly extending wall 26 of sealing disk 20. Groove 210 forms the rupturable membrane 23 at the base of groove. The rupturable membrane 23 formed by groove 210 (FIG. 2B) forms a weak area in the surface of downwardly extending wall 220 of the sealing disk. Groove 210 can be made by the use of a cutting die, e.g., a die having a raised edge (knife edge) which is pressed onto the underside of downwardly extending wall 26. The groove 210 made in this manner allows the membrane 23 at the base of groove 210 to be formed thinner than if the groove 210 is molded into downwardly extending wall 26. Groove 210 formed by a cutting die can thus result in a rupturable membrane 23 of very small width and very small thickness (FIG. 2B). The membrane 23 (FIG. 2B) formed by groove cut 210 can be designed to rupture at the desired threshhold pressure by adjusting the depth the cut, which in turn forms a rupturable membrane 23 of a desired thickness at the base of the cut.

The membrane 23 formed by groove cut 210 (FIG. 2B) abuts the underside of downwardly extending wall 45 of metal support disk 40. A portion of membrane 23 (FIG. 2B) can underlie one or more apertures 48 in downwardly extending wall 45 of metal support disk 40 in the same manner as described with respect to the embodiment shown in FIG. 1. It will be appreciated that groove cut 210 (FIG. 2B) does not have to be in the shape of continuous closed circle, but can be an arcuate segment, preferably long enough so that the portion of groove 210 underlying aperture 48 is continuous over the width of aperture 48. That is, groove 210 (FIG. 2B) does not have to extend to portions 220 of the downwardly extending wall 26 not overlaid by aperture 48.

In a specific embodiment, by way of a non limiting example, the sealing disk 20 can be of nylon, and the groove cut 210 (FIG. 2B) can have a width, typically between about 0.08 and 1.0 mm, preferably between about 0.08 and 0.8 mm. The membrane 23 (FIG. 2B) formed at the base of the groove cut can have a thickness such that the ratio of the membrane 23 thickness to the thickness of the downwardly extending wall 26 immediately adjacent groove 210 is between about 1/10 and 1/2, preferably between about 1/5 to 1/2. In such embodiment the membrane 23 formed by groove cut 210 (FIG. 2B) will rupture when the gas pressure within the cell builds up to a lower level of between about 500 and 700 psig ($3.38 \times 10^6$ and $4.83 \times 10^6$ pascal). This in turn allows the cell housing 70 to be designed with a smaller wall thickness, for example, between about 4 and 8 mils (0.10 and 0.20 mm).

It should be appreciated that aperture 48 is not intended to be limited to any particular shape and other shapes, for example, square, oval, rectangular, parallelepiped or of irregular shape having nonparallel opposing sides, e.g., star or triangular shapes, for aperture 48 are also suitable. Such other configurations for aperture 48 may have comparable effective diameter or cross-sectional area to the above mentioned circular configuration. It should also be appreciated that while nylon is a preferred material for insulating disk 20 and integral rupturable membrane portion 23, other materials, preferably hydrogen permeable, corrosion resistant, durable plastic material. The combination of membrane 23 thickness and aperture 48 size may be adjusted depending on the ultimate tensile strength of the material employed and level of gas pressure at which rupture is intended. It has been determined to be adequate to employ only one aperture 48 and corresponding one rupturable membrane 23. However, downwardly extending wall 45 may be provided with a plurality of comparably sized apertures with plurality of underlying rupturable membrane portions 23 integral to wall 26 of size and thickness above described. Preferably, two diametrically opposed apertures 48 in metal surface 45 can be employed. This would provide additional assurance that membrane rupture and venting would occur at the desired gas pressure.

The end cap assembly 10 of the invention is preferably inserted into the open end 73 of an alkaline cell. A cross-sectional view of a representative alkaline cell is shown in FIG. 3. Such alkaline cells have a cylindrical housing (casing) 70 initially formed with one end 170 closed and the opposite end open. Alkaline cells have an anode 150 comprising zinc, a cathode 110 comprising manganese dioxide, an electrolyte of aqueous solution comprising potassium hydroxide and a separator material 140 typically comprising rayon or cellulose, desirably a combination of rayon and polyvinylalcohol fibers. After the cell is filled with anode 150 and cathode 110 material, an end cap assembly 10 is ready for insertion into the open end to seal the cell and is crimped in place as described above. An imprinted plastic film label, for example of polyvinylchloride, for the cell can be heat shrunk around the housing 70 surface or else adhered to the housing with adhesive. End cap 120 functions as the negative terminal and the central portion 172 at the closed end 170 functions as the positive terminal.

Materials of construction for housing 70 may preferably be nickel plated steel. Metal support 40 is constructed of a conductive metal having good mechanical strength and corrosion resistance such as nickel plated cold rolled steel or stainless steel, preferably, low carbon steel. Insulating disk 20 and integral rupturable membrane 23 may be composed of a durable, corrosion resistant plastic which is permeable to hydrogen and which at appropriate thickness forms a rupturable membrane. Insulating disk 20 and integral rupturable membrane 23 may be composed of a polyamide (nylon). Alternatively, insulating disk 20 and membrane 23 may be composed of polypropylene, talc filled polypropylene, sulfonated polyethylene, or other polyethylenes. Current collector 60 can be selected from a variety of known electrically conductive metals found to be useful as current collector materials, for example, brass, tin plated brass, bronze, copper or indium plated brass.

Although the present invention has been described with respect to specific embodiments, it should be appreciated that variations are possible within the concept of the invention. Accordingly, the invention is not intended to be limited to the specific embodiments described herein but will be defined by the claims and equivalents thereof.

What is claimed is:

1. An electrochemical cell comprising an open ended cylindrical housing and an end cap assembly inserted therein closing said housing, said end cap assembly comprising a support disk comprising metal and an underlying electrically insulating sealing disk when the cell is viewed in vertical position with the end cap assembly on top, wherein said support disk has a downwardly extended surface, said downwardly extended surface extending downwardly from a high point thereon to low point thereon, said downwardly extended surface being slanted at an angle of between 40 and 80 degrees from the cell's central longitudinal axis so that said high point is closer to the cell's central longitudinal axis than said low point when the cell is viewed in vertical position with the end cap assembly on top, said downwardly extended surface having at least one aperture therethrough, wherein said sealing disk comprises plastic material and has a downwardly extending wall abutting said downwardly extended surface of said support disk on the side thereof facing the cell interior, wherein said abutting wall of said sealing disk has a groove on its inside surface facing the cell interior, said groove forming a rupturable membrane abutting said aperture, whereby when gas pressure within the cell rises, said rupturable membrane penetrates through said aperture and ruptures thereby releasing gas into the surrounding environment through said aperture.

2. The cell of claim 1 wherein said housing comprises steel and said housing has a wall thickness of between 4 and 8 mils (0.10 and 0.20 mm).

3. The cell of claim 1 wherein the portion of downwardly extending wall of said sealing disk immediately adjacent said groove has a thickness greater than said rupturable membrane, wherein the ratio of thickness of the rupturable membrane formed by said groove to the thickness of said downwardly extending wall immediately adjacent said groove is less than 1/2.

4. The cell of claim 1 wherein the portion of downwardly extending wall of said sealing disk immediately adjacent said groove has a thickness greater than said rupturable membrane, wherein the ratio of thickness of the rupturable membrane formed by said groove to the thickness of said downwardly extending wall immediately adjacent said groove is between ½ and 1/10.

5. The cell of claim 1 wherein the thickness of said rupturable membrane formed by said groove is between about 0.08 and 0.15 mm.

6. The cell of claim 1 wherein said aperture in said support has an area between 7 and 60 mm².

7. In an electrochemical cell having an open ended cylindrical housing and an end cap assembly inserted therein closing said housing, said cell having a positive and a negative terminal, said end cap assembly comprising an electrically insulating sealing disk, said insulating sealing disk having an elongated electrically conductive current collector passing therethrough, the current collector being in electrical contact with a cell terminal, the improvement comprising:

the end cap assembly comprising a support disk comprising metal, and the insulating sealing disk underlying said support disk when the cell is viewed in vertical position with the end cap assembly on top, wherein said insulating disk electrically insulates the support disk from the cell housing; said support disk being of single piece metallic construction having a convoluted surface and at least one aperture therethrough; said insulating disk having a convoluted surface wherein a portion of its surface underlies said aperture in said support disk when the cell is viewed in vertical position with the end cap assembly on top, wherein said insulating disk comprises a plastic material having a downwardly extending wall slanted at an angle between 40 and 80 degrees from the cell's central longitudinal axis, said downwardly extending surface of said insulating disk extends downwardly from a high point thereon to low point thereon, said high point being closer to the cell's central longitudinal axis than said low point when the cell is viewed in vertical position with the end cap assembly on top, wherein said support disk has a downwardly extending surface slanted at an angle between 40 and 80 degrees from the cell's central longitudinal axis, said downwardly extending surface of the support disk extends downwardly from a high point thereon to low point thereon, said high point being closer to the cell's central longitudinal axis than said low point when the cell is viewed in vertical position with the end cap assembly on top, wherein the downwardly extending wall of the insulating disk comprises a rupturable membrane underlying at least a substantial portion of the downwardly extending surface of said support disk, wherein at least one aperture in said support disk penetrates through said downwardly extending surface of said support disk, wherein a portion of said rupturable membrane underlies and abuts said aperture, said portion of said insulating disk underlying said aperture having a groove on a side of its surface facing the cell interior, said groove having an open end and opposing closed base wherein the base of said groove forms a thinned rupturable membrane abutting said aperture in said support disk, whereby when gas pressure within the cell rises, said rupturable membrane penetrates through said aperture and ruptures thereby releasing gas into the surrounding environment through said aperture.

8. The electrochemical cell of claim 7 wherein said groove on said insulating disk surface circumvents the center of said sealing disk.

9. The electrochemical cell of claim 7 wherein said rupturable membrane formed by said groove has a width to thickness ratio of between about 2.5 and 12.5.

10. The electrochemical cell of claim 9 wherein said groove on said insulating disk surface has a width of between about 0.1 and 1 mm.

11. The electrochemical cell of claim 7 wherein the housing comprises steel and said housing has a wall thickness between 4 and 8 mils (0.10 and 0.20 mm).

12. The electrochemical cell of claim 7 wherein a portion of the insulating disk contacts said support disk in the region of a surface of said support disk immediately adjacent said aperture.

13. The electrochemical cell of claim 7 wherein in said downwardly extending surface of said support disk is slanted from the cell's central longitudinal axis at the same angle as said downwardly extending surface of the insulating sealing disk.

14. The electrochemical cell of claim 7 wherein said aperture in said support has an area between about 7 and 16 mm² and said rupturable membrane at the base of said groove has a thickness between about 0.08 and 0.15 mm.

15. The electrochemical cell of claim 7 wherein the end cap assembly further comprises an insulating washer over the support disk and a terminal end cap over said insulating washer, said terminal end cap being welded to the support disk.

16. The electrochemical cell of claim 7 wherein the surface of said support disk has a substantially flat central portion.

17. The electrochemical cell of claim 7 wherein said current collector is welded to said support disk.

18. The electrochemical cell of claim 7 wherein support disk has a pair of opposing apertures in the downwardly extending surface of said disk.

19. The electrochemical cell of claim 7 wherein the support disk has a peripheral outer edge and a substantially flat central portion, wherein said central portion is at right angle to the cell's central longitudinal axis and said downwardly extending surface of the support disk extends downwardly from said central portion to said peripheral outer edge.

20. The electrochemical cell of claim 19 wherein said central portion of the support disk extends outwardly beyond the edge of the cylindrical housing at the open end thereof, and wherein the peripheral edge of said support disk bites into the peripheral edge of said insulating sealing disk and exerts radial compressive forces on said sealing disk.

21. In an electrochemical cell having an open ended cylindrical housing and an end cap assembly inserted therein closing said housing, said cell having a positive and a negative terminal, said end cap assembly comprising a terminal end cap and an electrically insulating sealing disk, said insulating disk having an elongated electrically conductive current collector passing therethrough and in electrical contact with said terminal end cap, and the edge of said housing being crimped over the peripheral edge of said insulating sealing disk to form a cell shoulder along the line of crimp, the improvement comprising:

said housing comprises steel and having a wall thickness between 4 and 8 mils (0.10 and 0.20 mm), the end cap assembly comprising a support disk of single piece metallic construction having a convoluted surface and at least one aperture therethrough, said support disk underlying said terminal end cap and said insulating sealing disk underlying said support disk when the cell is viewed in vertical position with the end cap assembly on top, wherein the insulating disk electrically insulates said support disk from the cell housing; said insulating disk comprising plastic material and having a downwardly extended wall extending downwardly towards the cell interior, said downwardly extending wall of said insulating sealing disk slanted downwardly from a high point thereon to low point thereon at an angle of between 40 and 80 degrees from the cell's central longitudinal axis, said high point being closer to the cell's central longitudinal axis than said low point when the cell is viewed in vertical position with the end cap assembly on top, wherein a portion of said downwardly extending wall of the insulating disk underlies said aperture in said support disk when the cell is viewed in vertical position with the end cap assembly on top, said portion of said downwardly extending wall of said insulating disk having a groove on a side thereof facing the cell interior, said groove having an open end and opposing closed base, wherein the base of said groove forms a thinned rupturable membrane abutting said aperture in said support disk, whereby when gas pressure within the cell rises said rupturable membrane penetrates through said aperture and ruptures thereby releasing gas into the surrounding environment through said aperture.

22. The electrochemical cell of claim 21 wherein said groove on said downwardly extending wall of said insulating disk circumvents the center of said insulating disk.

23. The electrochemical cell of claim 21 wherein said rupturable membrane formed by said groove has a width to thickness ratio of 2.5 to 12.5.

24. A The cell of claim 21 wherein the portion of downwardly extending wall of said sealing disk immediately adjacent said groove has a thickness greater than said rupturable membrane, wherein the ratio of thickness of the rupturable membrane formed by said groove to the thickness of said downwardly extending wall immediately adjacent said groove is between ½ and ⅒.

25. The electrochemical cell of claim 21 wherein said aperture in said support has an area between about 7 and 16 mm$^2$ and said rupturable membrane at the base of said groove has a thickness between about 0.08 and 0.15 mm.

26. The electrochemical cell of claim 21 wherein a portion of said downwardly extending wall of said insulating disk contacts said support disk in the region of a surface of said support disk immediately adjacent said aperture.

27. The electrochemical cell of claim 21 wherein said insulating disk comprises a plastic material and said downwardly extending surface of said insulating disk is slanted at an angle between about 40 and 80 degrees from the cell's central longitudinal axis.

28. The electrochemical cell of claim 21 wherein said support disk has a downwardly extending surface extending downwardly towards the cell interior and not parallel to the cell's central longitudinal axis, said downwardly extending surface of said support disk extends downwardly from a high point thereon to a low point thereon, said high point being closer to the cell's central longitudinal axis than said low point when the cell is viewed in vertical position with the support disk on top, wherein the downwardly extending surface of the insulating disk underlies and abuts at least a substantial portion of said downwardly extending surface of the support disk.

29. The electrochemical cell of claim 25 wherein the width of the rupturable membrane is between about 0.08 and 1.0 mm.

* * * * *